Figure 1:
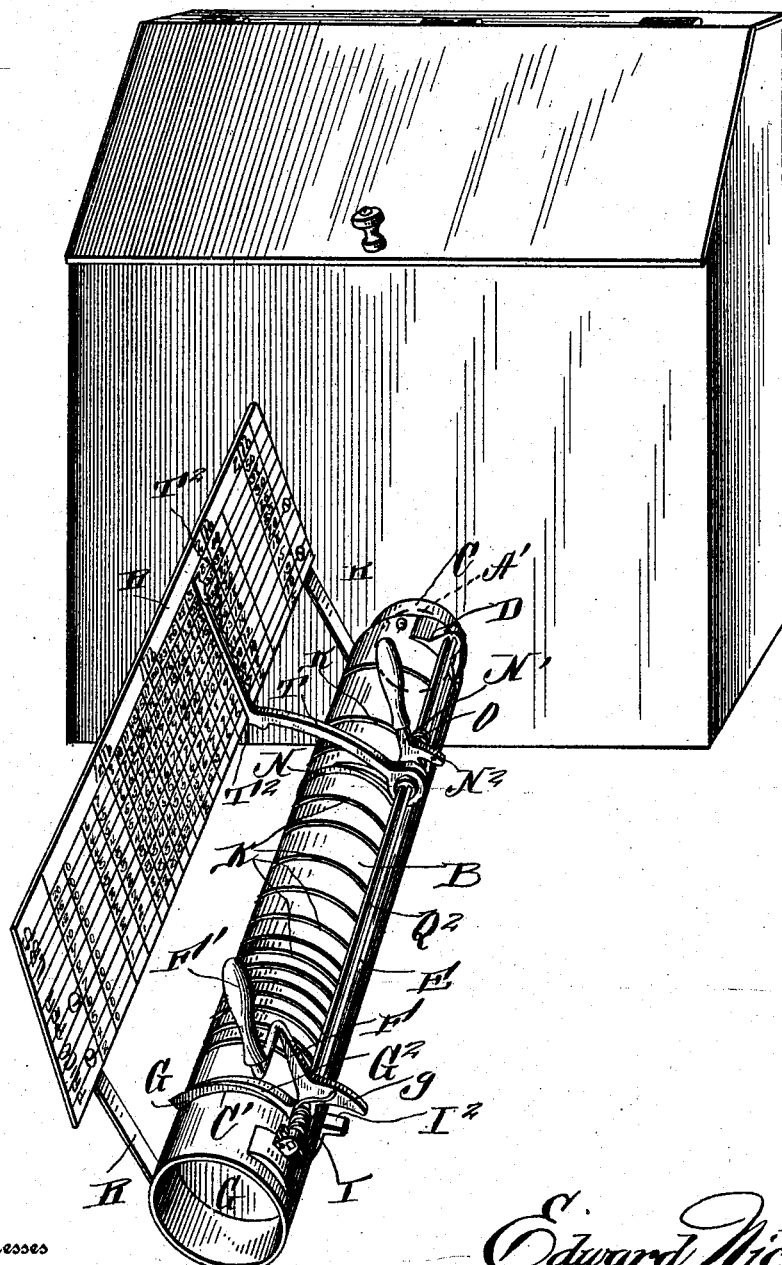

E. NICHOLAS.
SELF MEASURING AND COMPUTING APPARATUS.
APPLICATION FILED AUG. 4, 1908.

911,750.

Patented Feb. 9, 1909.
3 SHEETS—SHEET 1.

Witnesses

Inventor
Edward Nicholas.
By Franklin N. Hough
Attorney

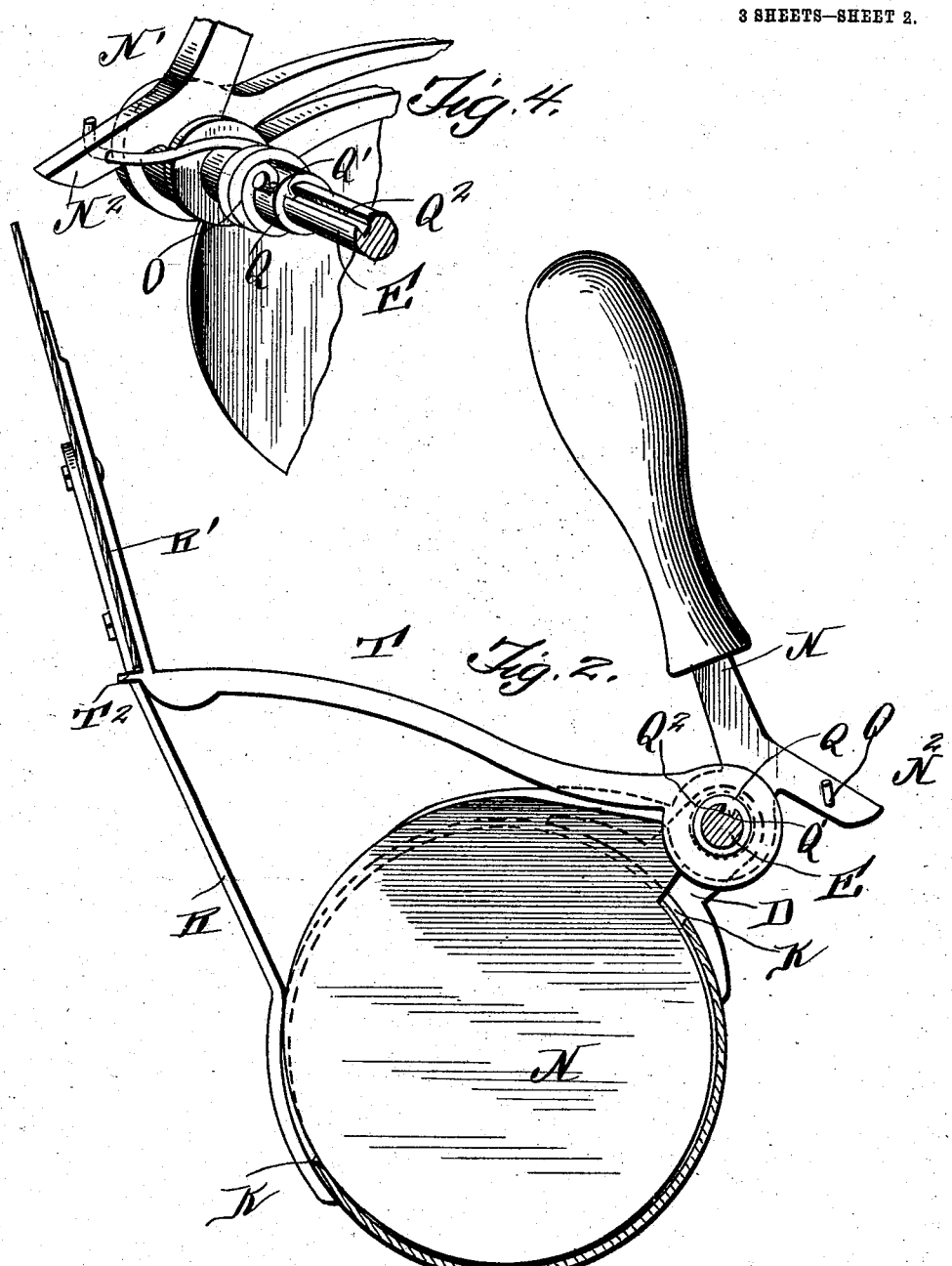

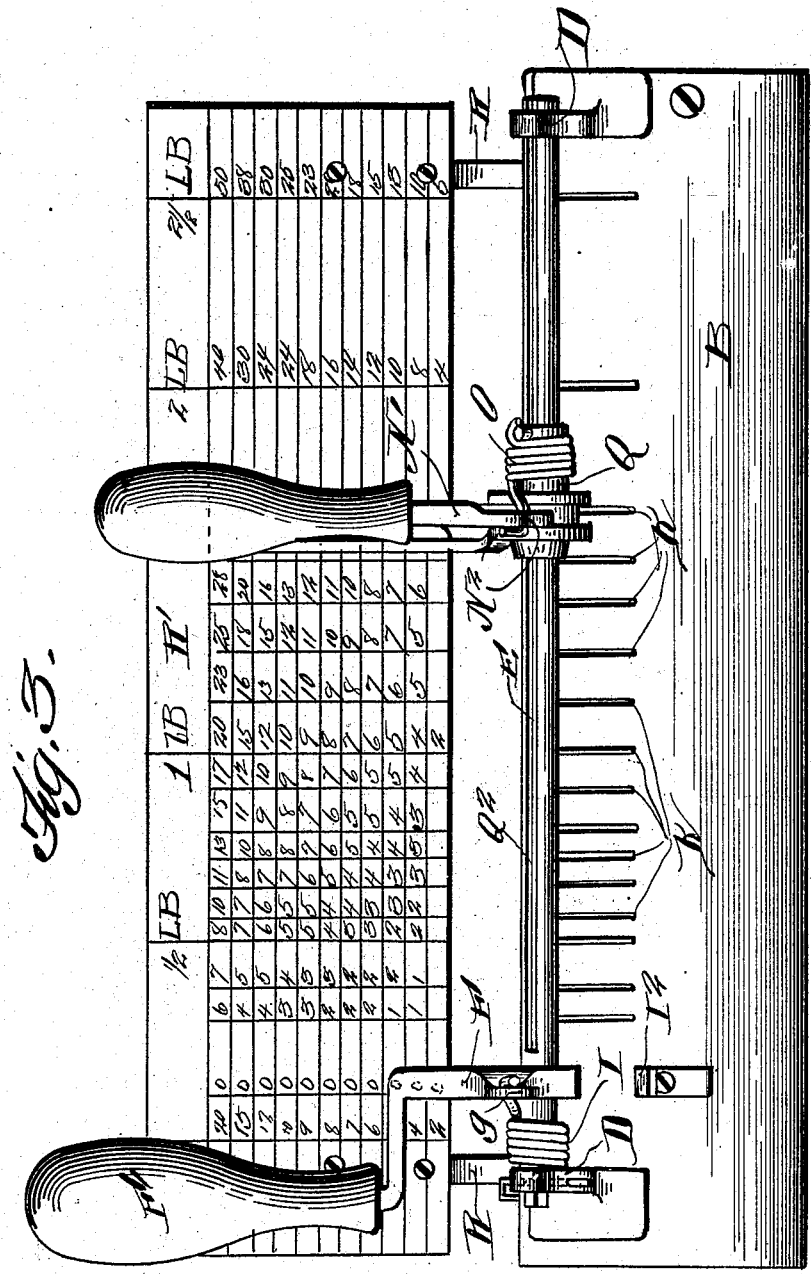

UNITED STATES PATENT OFFICE.

EDWARD NICHOLAS, OF KOKOMO, INDIANA.

SELF MEASURING AND COMPUTING APPARATUS.

No. 911,750.  Specification of Letters Patent.  Patented Feb. 9, 1909.

Application filed August 4, 1908. Serial No. 446,909.

*To all whom it may concern:*

Be it known that I, EDWARD NICHOLAS, a citizen of the United States, residing at Kokomo, in the county of Howard and State of Indiana, have invented certain new and useful Improvements in Self Measuring and Computing Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combination computing and measuring apparatus and the object in view is to produce a simple and efficient device of this nature so constructed that various commodities may be measured and the price of a pound or fraction of a pound automatically indicated.

More specifically the invention consists of a delivery tube or shell having a stationary pivotal gate and an adjustable gate adapted to be normally held by springs at different locations within the tube or shell accordingly as it might be desired to dispense different quantities of commodities and at the same time indicate the amount of the commodity thus weighed at different prices per pound.

The invention comprises various details of construction, combinations and arrangements of parts which will be hereinafter fully described and then specifically defined in the appended claims.

My invention is illustrated in the accompanying drawings, in which:—

Figure 1 is a perspective view of my improved self-measuring and computing apparatus as applied to a bin. Fig. 2 is an enlarged transverse sectional view through the tube upon which the gates are mounted. Fig. 3 is an enlarged side elevation of the tube showing the graduated scale giving the subdivisions giving the different prices of pounds and fractions of a pound, and Fig. 4 is an enlarged detail perspective view.

Reference now being had to the details of the drawings by letter, A designates a bin or receptacle having an exit opening A' disposed preferably at an inclination. The bottom of said bin or receptacle is preferably inclined so that the commodity to be weighed may fall through the exit opening when allowed to do so.

B designates a tubular shell which may be of any length or diameter and is adapted to telescope with the pipe C about the exit opening in the bin and fastened thereto in any suitable manner. D—D designate lugs projecting from the circumference of said shell, and E is a stationary shaft mounted in apertures in said lug. Keyed to said shaft is an angle lever F having a handle F' thereon and also a gate, designated by letter G, said gate being preferably in circular outline and adapted to pass through a slit G' formed in said shell. Said gate has a flange $G^2$ about a portion of its marginal edge and is adapted to serve as a stop to limit the throw of the gate in one direction. A spring I is fastened at one end to one of said lugs and at its other end to the angle lever and serves to normally hold the gate closed within the shell. A stop $I^2$ is mounted upon the shell and a finger $g$ upon said angle lever coming in contact with said stop will serve to limit the outer throw of the gate. Said shell has a series of slits, designated by letter K, extending substantially one half way through the diameter of the shell and which slits K are adapted for the reception of the adjustable gate N which is mounted upon an angle lever N' journaled upon said shaft.

A spring O is fastened at one end to a finger $N^2$ upon the angle lever N' and its other end is fastened to a sleeve Q having a key Q' movable in a longitudinal groove $Q^2$ formed in said shaft.

Mounted upon the bars R which are fixed to the shell is a graduated plate R' having arranged in suitable order thereon columns of numerals, also divisions indicating one-half, one pound, two pounds and two and a half pounds, commodities to be measured and also arranged thereon in columns numerals indicating prices per pound, also numerals indicating the amount that fractions of pounds would amount to at different prices. Movably mounted upon said shaft is a rod T which is splined to the shaft and has a series of pointers T' projecting from a raised portion of said rod, each pointer adapted to indicate opposite a numeral in any one of the columns of numerals. A finger $T^2$ projects from said rod and extends underneath the lower edge of the plate. Said rod is fixed to move with the sliding gate N so that, when the gate N is inserted in any of the slits provided for its reception, a certain amount of a commodity may be measured and the amount of the commodity measured indicated upon the graduated plate at different prices per pound. For instance, in the drawings, the gate N is inserted in one of the slits of the tube in proper position to weigh one pound of a commodity and opposite the indicating pointers upon said rod may be seen how much the pound would cost and varying prices per pound indicated by the column of numerals at the extreme left end of the plate.

In operation, the gate N is set in any one or another of the slits in the shell in order to weigh the amount of the commodity desired, after which the gate G is swung open to allow the shell to fill between the two gates, after which the gate G is closed and the gate N opened to allow the commodity to make exit through the lower end of the shell.

It will thus be seen from the foregoing taken in connection with the drawings that a simple and efficient weighing apparatus is afforded which will weigh out various amounts of commodities and at the same time indicate upon the graduated plate the amount at various prices per pound or fraction of a pound, the apparatus being entirely automatic in its action.

What I claim to be new is:—

1. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a pivotally mounted gate adapted to move in one of the slits of said shell, a sliding pivotally mounted gate adapted to swing into one or another of the slits in the shell, and means movable with the sliding gate and adapted to indicate opposite the numerals of said plate, as set forth.

2. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a pivotal spring-actuated gate adapted to swing into one of said slits of the shell, a sliding spring-actuated and pivotal gate designed to swing into one or another of the slits of the shell, and means movable with the sliding gate and adapted to indicate the numerals of said plate, as set forth.

3. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a spring-actuated gate adapted to spring into one of said slits, means for limiting the outer swinging movement of said gate, a pivotal spring-actuated sliding gate adapted to spring into one or another of said slits, and means movable with the sliding gate and adapted to indicate opposite the numerals upon said plate, as set forth.

4. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a spring-actuated gate adapted to spring into one of said slits, means for limiting the outer swinging movement of said gate, a pivotal spring-actuated sliding gate adapted to spring into one or another of said slits, means movable with the sliding gate and adapted to indicate opposite the numerals upon said plate, and means for limiting the outer throw of said sliding gate, as set forth.

5. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a pivotal spring-actuated lever, a gate fixed thereto and adapted to swing into one of the slits of said shell, a projection upon said lever, a stop upon the shell against which said finger is adapted to contact to limit the throw of the lever in one direction, a pivotal spring-actuated sliding lever, a gate upon the latter adapted to engage one or another of the slits of said shell, a projection upon said sliding lever adapted to contact with the shell as the lever is swung in one direction, and means movable with the sliding lever adapted to indicate opposite numerals upon said plate, as set forth.

6. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a shaft mounted adjacent to said shell, a pivotally mounted lever upon said rod, a gate upon said lever adapted to swing into one of the slits of the shell, a second lever slidably held upon said shaft, a gate fixed to said second lever and adapted to swing into one or another of the slits of said shell, and means movable with the sliding lever and adapted to indicate opposite the numerals of said plate, as set forth.

7. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a pivotally mounted lever, a gate fixed to the latter and adapted to swing into one of the slits of said shell, a sliding pivotal lever, a gate mounted upon the latter adapted to swing into one or another of the slits of the shell, a rod movable with the sliding lever and having pointers adapted to indicate adjacent to the numerals of said plate, as set forth.

8. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a shaft mounted parallel with the shell and having a longitudinal groove therein, a pivotal spring-actuated lever mounted upon said shell, a gate fixed to said lever and adapted to swing into one of the slits of said shell, a pivotally mounted sliding lever splined to said shaft, a gate fixed to said sliding lever adapted to swing into one or another of the slits of the shell, and means movable with the sliding lever and adapted to indicate opposite the slits in the plate, as set forth.

9. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a shaft mounted parallel with the shell and having a longitudinal groove therein, a pivotal spring-actuated lever mounted upon said shell, a gate fixed to said lever and adapted to swing into one of the slits of said shell, a pivotally mounted sliding lever splined to said shaft, a gate fixed to said sliding lever adapted to swing into one or another of the slits of the shell, a sleeve splined to said shaft and movable with the sliding lever, and a rod projecting from said sleeve and indicating opposite the numerals upon said plate, as set forth.

10. A self-measuring and computing apparatus comprising a receptacle, a shell leading from an exit opening in the receptacle at an inclination, a graduated plate having columns of numerals thereon indicating pounds or fractions thereof and prices per pound, said shell having slits therein, a shaft mounted parallel with the shell and having a longitudinal groove therein, a pivotal spring-actuated lever mounted upon said shell, a gate fixed to said lever and adapted to swing into one of the slits of said shell, a pivotally mounted sliding lever splined to said shaft, a gate fixed to said sliding lever adapted to swing into one or another of the slits of the shell, a sleeve splined to said shaft and movable with the sliding lever, a rod projecting from said sleeve and having a series of pointers adapted to indicate opposite numerals upon the plate, and a finger projecting underneath the plate, as set forth.

In testimony whereof I hereunto affix my signature in the presence of two witnesses.

EDWARD NICHOLAS.

Witnesses:
   Oscar Lewellyn,
   Charlie R. Curlee.